United States Patent
Kim et al.

(10) Patent No.: US 9,825,283 B2
(45) Date of Patent: Nov. 21, 2017

(54) CATHODE ACTIVE MATERIAL FOR SECONDARY BATTERY AND LITHIUM SECONDARY BATTERY COMPRISING THE SAME

(71) Applicant: LG Chem, Ltd., Seoul (KR)

(72) Inventors: Soo Jung Kim, Daejeon (KR); Jae Bin Chung, Daejeon (KR); Byung O Park, Daejeon (KR)

(73) Assignee: LG Chem, Ltd. (KR)

( * ) Notice: Subject to any disclaimer, the term of this patent is extended or adjusted under 35 U.S.C. 154(b) by 454 days.

(21) Appl. No.: 14/409,532

(22) PCT Filed: Jul. 31, 2013

(86) PCT No.: PCT/KR2013/006872
§ 371 (c)(1),
(2) Date: Dec. 19, 2014

(87) PCT Pub. No.: WO2014/021626
PCT Pub. Date: Feb. 6, 2014

(65) Prior Publication Data
US 2015/0162598 A1 Jun. 11, 2015

(30) Foreign Application Priority Data
Aug. 3, 2012 (KR) .................. 10-2012-0085167

(51) Int. Cl.
*H01M 4/131* (2010.01)
*H01M 4/525* (2010.01)
(Continued)

(52) U.S. Cl.
CPC .......... *H01M 4/131* (2013.01); *H01M 4/364* (2013.01); *H01M 4/483* (2013.01); *H01M 4/525* (2013.01);
(Continued)

(58) Field of Classification Search
CPC ...... H01M 4/131; H01M 4/505; H01M 4/525; H01M 4/5825; H01M 4/364; H01M 4/02;
(Continued)

(56) References Cited

U.S. PATENT DOCUMENTS

| 6,753,111 B2 | 6/2004 | Kweon et al. |
| 7,981,544 B2 | 7/2011 | Morishima |

(Continued)

FOREIGN PATENT DOCUMENTS

| CN | 101305484 A | 11/2008 |
| CN | 101752558 A | 6/2010 |

(Continued)

OTHER PUBLICATIONS

International Search Report for Application No. PCT/KR2013/006872 dated Nov. 6, 2013.

(Continued)

*Primary Examiner* — Kenneth J Douyette
(74) *Attorney, Agent, or Firm* — Lerner, David, Littenberg, Krumholz & Mentlik, LLP (57) ABSTRACT

Disclosed are a cathode active material for secondary batteries and a lithium secondary battery including the same. More particularly, a cathode active material for secondary batteries having an operating voltage area of 2.50 V to 4.35 V, including a lithium cobalt-based oxide and a surface-treated lithium nickel-based oxide and having high rolling density by a bimodal form in which an average diameter of the cobalt-based oxide and an average diameter of the lithium nickel-based composite oxide are different, and a lithium secondary battery including the same are disclosed.

21 Claims, 3 Drawing Sheets

(51) Int. Cl.
*H01M 4/48* (2010.01)
*H01M 10/0525* (2010.01)
*H01M 4/36* (2006.01)
*H01M 4/62* (2006.01)
*H01M 10/052* (2010.01)

(52) U.S. Cl.
CPC ............ *H01M 4/62* (2013.01); *H01M 4/623* (2013.01); *H01M 10/0525* (2013.01); *H01M 4/366* (2013.01); *H01M 10/052* (2013.01)

(58) Field of Classification Search
CPC .... H01M 4/366; H01M 4/383; H01M 10/052; H01M 10/0525
See application file for complete search history.

(56) References Cited

U.S. PATENT DOCUMENTS

| | | |
|---|---|---|
| 2003/0003352 A1* | 1/2003 | Kweon ............... H01M 4/0404 429/137 |
| 2006/0204845 A1 | 9/2006 | Chang et al. |
| 2006/0257745 A1 | 11/2006 | Choi et al. |
| 2008/0118847 A1 | 5/2008 | Jung et al. |
| 2009/0087731 A1 | 4/2009 | Fukui et al. |
| 2009/0233176 A1 | 9/2009 | Kita et al. |
| 2011/0151328 A1 | 6/2011 | Chang et al. |
| 2012/0015250 A1 | 1/2012 | Teng et al. |
| 2012/0261610 A1 | 10/2012 | Paulsen et al. |
| 2014/0242464 A1 | 8/2014 | Chang et al. |

FOREIGN PATENT DOCUMENTS

| | | |
|---|---|---|
| CN | 102612776 A | 7/2012 |
| EP | 2851988 A1 | 3/2015 |
| JP | 2006228733 A | 8/2006 |
| JP | 2006286336 A | 10/2006 |
| JP | 2008532221 A | 8/2008 |
| JP | 2008234872 A | 10/2008 |
| JP | 2009099523 A | 5/2009 |
| KR | 20060091486 A | 8/2006 |
| KR | 20060094050 A | 8/2006 |
| KR | 20080075775 A | 8/2008 |
| WO | 2011054110 A1 | 5/2011 |
| WO | 2011054441 A1 | 5/2011 |

OTHER PUBLICATIONS

Shekarchi, etal., "Verification of wet and dry packing methods with experimental data." Fracture Mechanics of Concrete and Concrete Structures—High Performance, Fiber Fienforced Concrete, Special Loadings and Structural Applications. May 28, 2010, Korea Concrete Institute XP055307926, ISBN: 978-89-570818-2-2, pp. 1322-1327.

Huaman, et al., "Descriptors for the Cultivated Potato." Jan. 1, 1977, XP055307742, Retrieved from the Internet: URL:http://www.bioversityinternational.org/uploads/tx_news/Descriptors_for_the_cultivated_potatlo_381.pdf [retrieved on Oct. 5, 2016].

Search Report from Office Action from Chinese Application No. 201380037640.3, dated Nov. 22, 2016.

* cited by examiner

CATHODE ACTIVE MATERIAL FOR SECONDARY BATTERY AND LITHIUM SECONDARY BATTERY COMPRISING THE SAME

CROSS-REFERENCE TO RELATED APPLICATIONS

The present application is a national phase entry under 35 U.S.C. §371 of International Application No. PCT/KR2013/006872 filed Jul. 31, 2013, which claims the benefit of Korean Patent Application No. 10-2012-0085167, filed on Aug. 3, 2012, the disclosure of which is incorporated herein by reference.

TECHNICAL FIELD

The present invention relates to a cathode active material for secondary batteries and a lithium secondary battery including the same. More particularly, the present invention relates to a cathode active material for secondary batteries having an operating voltage area of 2.50 V to 4.35 V, including a lithium cobalt-based oxide and a surface-treated lithium nickel-based oxide, wherein the cathode active material has high rolling density by a bimodal form in which an average diameter of the cobalt-based oxide and an average diameter of the lithium nickel-based composite oxide are different, and a lithium secondary battery including the same.

BACKGROUND ART

Recently, mobile devices are steadily being reduced in weight and miniaturized, and, at the same time, are gradually being highly functionalized while providing a variety of functions. Accordingly, secondary batteries have gradually increasing capacity and voltage, and secondary batteries having long cycle lifespan, excellent stability at high potential, and excellent storage characteristics at high temperature are required.

Among lithium transition metal oxides broadly used as a cathode active material of lithium secondary batteries, $LiCoO_2$ is widely used due to excellent overall physical properties such as excellent cycle properties, and the like. However, $LiCoO_2$ is low in safety and expensive due to resource limitations of cobalt as a raw material. In addition, $LiCoO_2$ has a variety of problems such as a low charge and discharge current capacity of approximately 150 mAh/g, an unstable crystal structure under a voltage of 4.3 V or more, ignition risk due to reaction with an electrolyte and the like.

Meanwhile, as a cathode active material for lithium secondary batteries, a lithium transition metal oxide, in which some nickel is substituted with a different transition metal such as manganese, cobalt, and the like, is proposed. However, such a nickel-based lithium transition metal oxide substituted with a metal has advantages such as relatively excellent cycle and capacity characteristics, but does not sufficiently solve problems such as dramatic reduction of cycle characteristics after extended use, swelling event due to gas generation, low chemical stability and the like.

Regarding the above problems, impurities formed by a manufacturing raw material of an active material remaining in a nickel-based lithium transition metal oxide reduce battery capacity, or the impurities are decomposed and thereby generate gas, and, accordingly, in batteries, swelling occurs.

As one solution to the above problems, a technology to use a mixture of two or more different lithium transition metal oxides as a cathode material has been proposed. When the mixture of two or more different lithium transition metal oxides is used, drawbacks of separately using each lithium transition metal oxide may be overcome. However, the prior cathode material mixtures are prepared by simply mix two ingredients and thereby synergy effect beyond simple mixing may not be anticipated.

Therefore, there is an urgent need to develop a technology which is suitable for high capacity secondary batteries and may solve problems with stability at high temperature.

DISCLOSURE

Technical Problem

Therefore, the present invention has been made to solve the above and other technical problems that have yet to be resolved.

As a result of a variety of extensive and intensive studies and experiments, the inventors of the present invention confirmed that, when a lithium secondary battery is manufactured using a cathode active material including a lithium cobalt-based oxide and a surface-treated lithium nickel-based oxide, and having a bimodal form in which an average diameter of the cobalt-based oxide and an average diameter of the lithium nickel-based composite oxide are different, battery capacity is increased and high-temperature storage characteristics are improved, thus completing the present invention.

Technical Solution

In accordance with one aspect of the present invention, provided is a cathode active material for secondary batteries having an operating voltage area of 2.50 V to 4.35 V, the cathode active material including a lithium cobalt-based oxide and a surface-treated lithium nickel-based oxide and having high rolling density by a bimodal form in which an average diameter of the cobalt-based oxide and an average diameter of the lithium nickel-based composite oxide are different.

Inventors of the present invention confirmed that, when a lithium secondary battery is manufactured using the cathode active material, a form of which is a bimodal form, including a lithium cobalt-based oxide having excellent cycle characteristics and a lithium nickel-based oxide having a high-potential operating range due to stability at high voltage and, at the same time, excellent capacity characteristics, where average diameters of lithium cobalt-based oxide and lithium nickel-based oxide are different, rolling density of the cathode active material is improved and thereby capacity per volume is increased, when compared to a cathode active material using, separately, each of the oxides or a mixture of cathode active materials having a similar average diameter, and an operating voltage area thereof is extended to 2.50 V to 4.35 V, when compared to the existing operating voltage area of 3.0 V to 4.35 V, and thereby discharge end voltage is lowered, and, accordingly, capacity may be maximized.

As one specific embodiment, a rolling density of the cathode active material according to the present invention may be higher than a rolling density of a cathode active material composed of a lithium cobalt oxide and a lithium nickel-based oxide, average diameters of which are similar, and does not have a bimodal form. In detail, a rolling density of the cathode active material according to the present invention may be 3.8 to 4.0 g/cc. Accordingly, it can be confirmed that the rolling density of the cathode active material according to the present invention is dramatically increased, when compared to rolling density of 3.6 to 3.7 g/cc of a cathode active material, in which a lithium cobalt oxide and a lithium nickel-based oxide having similar average diameters are mixed and which does not have a bimodal form.

Figure 1:
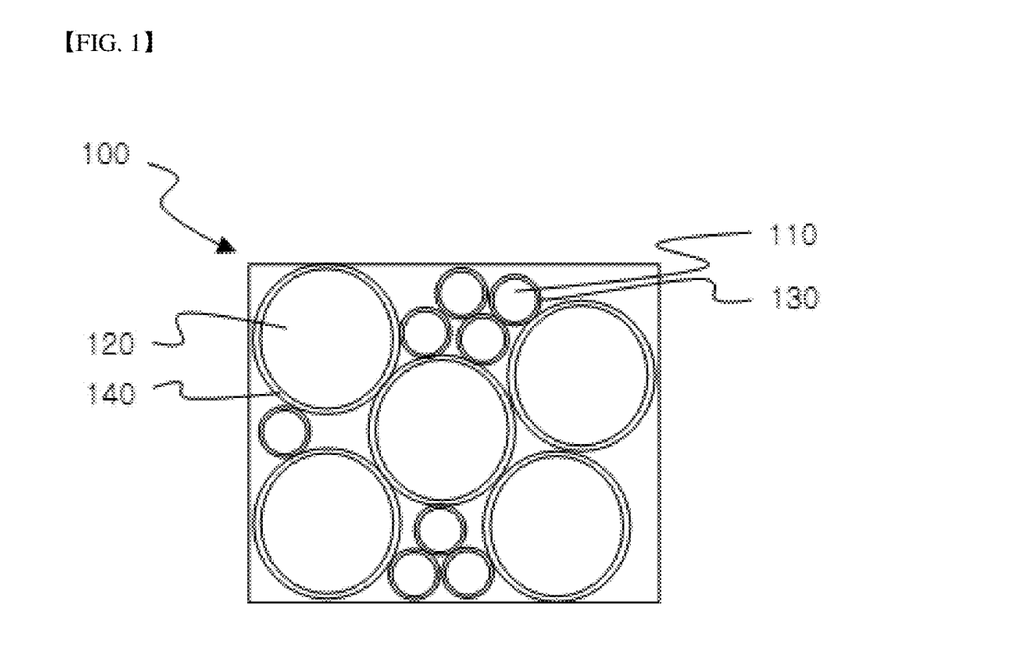
FIG. 1 is a partial schematic view of a cathode active material according to one embodiment of the present invention.
Figure 2:
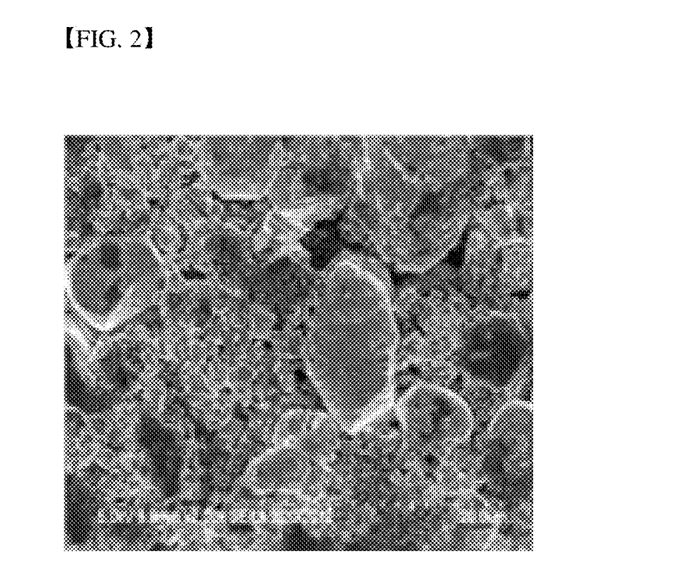
FIG. 2 is a scanning electron microscope (SEM) image of a cathode active material according to one embodiment of the present invention.

FIG. 1 schematically illustrates a portion of the cathode active material according to one embodiment of the present invention and FIG. 2 is a scanning electron microscope (SEM) image. Referring to a partial schematic view of FIG. 1, a cathode active material 100 is composed of a bimodal form in which particles of a lithium nickel-manganese-cobalt oxide 110 fill an interstitial volume among particles of a lithium cobalt oxide 120.

In such a structure, it can be confirmed that a diameter of the lithium cobalt oxide 120 is three to four times larger than a diameter of the lithium nickel-manganese-cobalt oxide 110.

Regarding this, constituents of the present invention will be described below.

As one specific embodiment, the lithium cobalt oxide may be potato shaped single particles and the lithium nickel-based oxide may be composed of an agglomerated structure, namely, an agglomerate of micro powders.

As one specific embodiment, an average diameter of the lithium cobalt-based oxide may be 16 to 25 μm, an average diameter of micro powder particles of the lithium nickel-based oxide may be 2 to 4 μm, and an average diameter of an agglomerate thereof may be 2 to 10 μm.

On the other hand, an average diameter of the lithium cobalt-based oxide may be 2 to 10 μm and an average diameter of an agglomerate of the lithium nickel-based composite oxide may be 16 to 25 μm.

As one specific embodiment, to improve stability, electrical conductivity, and rate characteristics of the cathode active material structure, the lithium cobalt-based oxide may also be doped with a heterometallic element. Here, the lithium cobalt-based oxide may be represented by Formula 1 below.

$$Li(Co_{(1-a)}M_a)O_2 \quad (1)$$

wherein $0.1 \leq a \leq 0.2$ and

M may be at least one element selected the group consisting of Mg, Ti, Zr, Al and Si.

For example, M may be Mg and/or Ti, more particularly Mg and Ti.

Inventors of the present invention confirmed that structural stability of the cathode active material is improved when the lithium cobalt-based oxide is doped with Mg, and electrical conductivity and rate characteristics of the cathode active material are improved, compared to the prior cathode active material, when the lithium cobalt-based oxide is doped with Ti.

As one specific embodiment, the amount of Mg and/or Ti may be 1000 to 2500 ppm based on the total amount of the lithium cobalt-based oxide.

When the amount of Mg is excessively low, structural stability is reduced at high voltage and high temperature lifespan characteristics and the like are reduced. On the other hand, when the amount of Mg is excessively high, it is difficult to obtain desired amount. In addition, when the amount of Ti is excessively low or high, it is difficult to obtain desired improvement effects in electrical conductivity and rate characteristics.

As one specific embodiment, to improve high-voltage and high-temperature storage characteristics of lithium secondary batteries, a whole surface of the lithium cobalt-based oxide may be coated with $Al_2O_3$.

Referring to FIG. 1, a coating layer 140 of $Al_2O_3$ is formed over a surface of the lithium cobalt oxide 120.

Here, the amount of Al may be particularly 0.001 to 2000 ppm, more particularly 350 to 500 ppm, based on the total amount of the lithium cobalt-based oxide.

A coating thickness of $Al_2O_3$ may be, for example, 0.5 nm to 2 nm.

When Al is included in an amount of 2000 ppm or more, or $Al_2O_3$ is coated to a thickness of the coating thickness or more, surface resistance is relatively increased and thereby desired capacity may not be obtained and rate characteristics may be deteriorated. On the other hand, when the amount of Al is excessively low or a coating thickness thereof is too thin, desired improvement in high-temperature storage characteristics may not be obtained.

As one specific embodiment, $Al_2O_3$ may be coated over a whole surface of the lithium cobalt-based oxide through wet coating.

Wet coating is known in the art and thus detailed descriptions thereof are omitted.

As one specific embodiment, the lithium nickel-based oxide may be represented by Formula 2 below.

$$Li_{1+x}Ni_aMn_bCo_{1-(a+b)}O_2 \quad (2)$$

wherein $-0.2 \leq x \leq 0.2$, $0.5 \leq a \leq 0.6$, and $0.2 \leq b \leq 0.3$.

As defined by Formula 2, a lithium nickel-based oxide, in which some nickel is substituted with other transition metals such as manganese, cobalt and the like, has relatively high capacity and exhibits high cycle stability.

The amount of cobalt, namely, $(1-(a+b))$, may be, for example, 0.1 to 0. When the amount of cobalt is excessively high, namely, $(1-(a+b))>0.3$, raw material costs are entirely increased and reversible capacity is slightly reduced. On the other hand, when the amount of cobalt is excessively low, namely, $(1-(a+b))<0.1$, it is difficult to obtain sufficient rate characteristics and electrical conductivity effects.

In addition, the amount of nickel (Ni), namely, (a), may be relatively high when compared to manganese and cobalt, and may be particularly 0.5 to 0.6. When the amount of nickel is less than 0.5, it is difficult to anticipate high capacity. On the other hand, when the amount of nickel exceeds 0.6, stability is reduced, and side reaction is increased during high-temperature storage and thereby high-temperature swelling may occur.

As one specific embodiment, a whole surface of the lithium nickel-based oxide may be coated by reacting with a fluorine-containing polymer or may be coated with a metal oxide.

As one specific embodiment, the fluorine-containing polymer may be PVdF or PVdF-HFP, more particularly PVdF.

As one specific embodiment, the metal oxide may be aluminum oxide ($Al_2O_3$).

Referring to FIG. 1, a coating layer 130 formed by using a fluorine-containing polymer or a metal oxide is formed over a surface of the lithium nickel-manganese-cobalt oxide 110.

As described above, capacity of a lithium secondary battery using a lithium nickel-based oxide may be reduced due to impurities formed by a remainder of manufacturing raw material of an active material, and the lithium secondary battery exhibits swelling event that generates gas by impurities decomposed in a battery during cycling.

However, as described above, when a coating layer is formed by reacting a lithium nickel-based oxide surface with a fluorine-containing polymer or the lithium nickel-based oxide surface is coated with $Al_2O_3$, excellent cycle characteristics and high battery capacity are exhibited due to a stable crystal structure and a high nickel content, and reactivity of $Li_2CO_3$, LiOH and the like being Li-containing by-products, which are generated by an excessive amount of an Li source used during a process of manufacturing a lithium nickel-based oxide, is extremely suppressed. Accordingly, decomposition of the Li-containing by-products or generation of gas by reaction with an electrolyte, during high-temperature charge, may be suppressed.

The "reactivity of Li-containing by-products is expressed" includes that auto reaction of Li-containing by-products, induction reaction to other materials, interaction with other materials and the like are prevented by reducing the amount of remaining Li-containing by-products, chemically blocking reaction sites of Li-containing by-products, physically surrounding Li-containing by-products, or the like.

The coating method may be varied, preferably may be a dry coating method or a wet coating method.

As one specific embodiment, coating of the lithium nickel-based oxide using the fluorine-containing polymer may be accomplished by blending the fluorine-containing polymer and the lithium nickel-based oxide, and by firing the blended product at high temperature to burn carbon such that, only fluorine remains on a surface of the lithium nickel-based oxide.

Meanwhile, coating of $Al_2O_3$ may be accomplished by mixing the lithium nickel-based oxide after mixing an aluminum-isopropoxide (Al-isopropoxide) solution as an Al supply precursor with an alcohol solvent, and then by firing in a range of 600 to 620 such that a coating layer is formed over a surface of the oxide.

As one specific embodiment, the amount of fluorine or metal elements of the coating layer may be 0.001 to 3000 ppm, particularly 1000 to 2000 ppm, based on the total weight of the lithium nickel-based oxide.

The thickness of the coating may be, for example, 0.5 nm to 2 nm.

When the coating layer includes fluorine or metal elements of 3000 ppm or more, or is coated beyond the coating thickness, the amount of the lithium nickel-based oxide is relatively reduced and thereby a desired amount is not obtained. On the other hand, when the amount of fluorine or metal elements is excessively low or a coating thickness is too thin, desired gas generation suppression effect may not be obtained.

As one specific embodiment, the lithium nickel-based oxide may be included in 10 to 50 wt %, more particularly 20 to 40 wt %, based on the total amount of the cathode active material.

When a mixed cathode active material including the lithium nickel-based oxide material is used in lithium secondary batteries in an amount of 10 to 50 wt % based on the total amount of the cathode active, rolling density is increased, when compared to a case that a lithium nickel-based oxide is used alone, as described above.

On the other hand, when a mixing ratio of the lithium nickel-based oxide exceeds 50 wt %, the amount of the lithium cobalt-based oxide is relatively reduced, and thereby excellent cycle characteristics may not be accomplished and storage characteristics at high voltage and at high temperature may be deteriorated due to an increased content ratio of the lithium nickel-based oxide. When a mixing ratio of the lithium nickel-based oxide is less than 10 wt %, rolling density is increased and an operating voltage area is extended, and thereby desired effects such as capacity increase may not be obtained.

In addition, the present invention provides a lithium secondary battery including the cathode active material of a bimodal form.

As one specific embodiment, an operating voltage area of the lithium secondary battery may be 2.50 to 4.35 V.

While an operating voltage area of the existing high voltage lithium secondary battery is 3.0 V to 4.35 V, the lithium secondary battery according to the present invention has an operating voltage area of 2.50 V to 4.35 V. Accordingly, an operating voltage area is extended and, as such, increase in cell capacity may be obtained.

The lithium secondary battery includes a cathode, an anode, a separator, and a lithium salt-containing non-aqueous electrolyte.

The cathode may be manufactured by, for example, coating a mixture of the cathode active material, a conductive agent, and a binder on a cathode current collector and drying the coated cathode current collector. The mixture may further include a filler as desired.

The cathode current collector is generally fabricated to a thickness of 3 to 500 µm. The cathode current collector is not particularly limited so long as it does not cause chemical changes in the fabricated battery and has high conductivity. For example, the cathode current collector may be made of stainless steel, aluminum, nickel, titanium, sintered carbon, and aluminum or stainless steel surface-treated with carbon, nickel, titanium silver or the like. The current collector may have fine irregularities at a surface thereof to increase adhesion between the cathode active material and the cathode current collector and may be used in any of various forms including films, sheets, foils, nets, porous structures, foams, and non-woven fabrics.

The conductive material is typically added in an amount of 1 to 30 wt % based on the total weight of the mixture including the cathode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fiber and metallic fiber; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an electrode active material and the conductive material and in binding of the electrode active material to an electrode current collector. The binder is typically added in an amount of 1 to 30 wt % based on the total weight of the mixture including the cathode active material. Examples of the binder include, without being limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The anode may be manufactured by coating, drying and pressing an anode active material on an anode current collector. In some cases, the above-described conductive material, binder, filler and the like may be selectively further coated on the anode current collector.

The anode current collector is typically fabricated to a thickness of 3 to 500 μm. The anode current collector is not particularly limited so long as it does not cause chemical changes in the fabricated battery and has conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. As in the cathode current collector, the anode current collector may have fine irregularities at a surface thereof to enhance adhesion between the anode current collector and the anode active material. In addition, the anode current collector may be used in various forms including films, sheets, foils, nets, porous structures, foams, and non-woven fabrics.

Examples of the anode active material include, without being limited to, carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Groups I, II and III elements, or halogens; $0 < x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, and the like; conductive polymers such as polyacetylene; and Li—Co—Ni-based materials.

The separator is disposed between the cathode, the anode and, as the separator, an insulating thin film having high ion permeability and mechanical strength is used. The separator typically has a pore diameter of 0.01 to 10 μm and a thickness of 5 to 300 μm. As the separator, sheets or non-woven fabrics, made of an olefin polymer such as polypropylene, glass fibers or polyethylene, which have chemical resistance and hydrophobicity, or kraft papers are used. Examples of commercially available separators include, but are not limited to, Celgard® series such as Celgard® 2400 and 2300 (available from Hoechest Celanese Corp.), polypropylene separators (available from Ube Industries Ltd., or Pall RAI Co.), and polyethylene series (available from Tonen or Entek).

In some cases, to enhance battery stability, a gel polymer electrolyte may be coated on the separator. Examples of such gel polymers include, but are not limited to, polyethylene oxide, polyvinylidenefluoride, and polyacrylonitrile.

When a solid electrolyte such as a polymer or the like is used as an electrolyte, the solid electrolyte may serve as both the separator and electrolyte.

A lithium salt-containing non-aqueous electrolyte is composed of a non-aqueous electrolyte and a lithium salt. As the non-aqueous electrolyte, a non-aqueous inorganic solvent, an organic solid electrolyte, or an inorganic solid electrolyte may be used, but the present is not limited thereto.

For example, the non-aqueous organic solvent may be an aprotic organic solvent such as N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte. Examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), or the like.

As one preferable embodiment, a lithium salt such as $LiPF_6$, $LiClO_4$, $LiBF_4$, $LiN(SO_2CF_3)_2$ and the like may be added to a mixture of cyclic carbonate of EC or PC as a high dielectric solvent and linear carbonate of DEC, DMC or EMC as a low viscosity solvent, to prepare a lithium salt-containing non-aqueous electrolyte.

Effects of the Invention

As described above, a cathode active material according to the present invention having a bimodal form in which a lithium cobalt-based oxide and a lithium nickel-based oxide, average diameters of which are different, are mixed in a specific mixing ratio, has increased rolling density and thereby increases capacity of a lithium secondary battery, when compared to a case that each of the oxides is separately used or a mixture of cathode active materials having similar average diameters is used.

In addition, when Mg and Ti are used as dopants, and a lithium cobalt-based oxide surface-coated with aluminum (Al) and a lithium nickel-based oxide coated with a fluorine-containing polymer or metal oxide are included, electrical conductivity, rate characteristics and cycle characteristics of a secondary battery may be improved, and gas generation may be suppressed during high-temperature storage and thus stability at high temperature is improved.

BRIEF DESCRIPTION OF THE DRAWINGS

The above and other objects, features and other advantages of the present invention will be more clearly understood from the following detailed description taken in conjunction with the accompanying drawings, in which.

MODE FOR INVENTION

Now, the present invention will be described in more detail with reference to the accompanying drawings. These examples are provided for illustrative purposes only and should not be construed as limiting the scope and spirit of the present invention.

Example 1

Manufacture of Cathode Active Material

After mixing $LiNi_{0.55}Mn_{0.30}Co_{0.15}O_2$ with PVdF, the mixture was heat-treated for nine hours in a temperature range of 150° C. to 600° C. to prepare $LiNi_{0.55}Mn_{0.30}Co_{0.15}O_2$ surface-treated with F (2000 ppm).

As a single-phase structure, $LiCoO_2$ having $D_{50}$ of 16 to 25 μm and $LiNi_{0.55}Mn_{0.30}Co_{0.15}O_2$ having $D_{50}$ of approximately 2 to 10 μm were mixed in a ratio of 70:30 to prepare a mixed cathode active material.

Comparative Example 1

Instead of a mixed cathode active material having a bimodal form, $LiCoO_2$ and $LiNi_{0.55}Mn_{0.30}Co_{0.15}O_2$ having a similar average diameter thereto were mixed to prepare a mixed cathode active material.

Experimental Example 1

Rolling density changes according to pressure added to cathode active materials prepared according to Example 1 and Comparative Example 1 were compared. Results are illustrated in FIG. 3.

Figure 3:
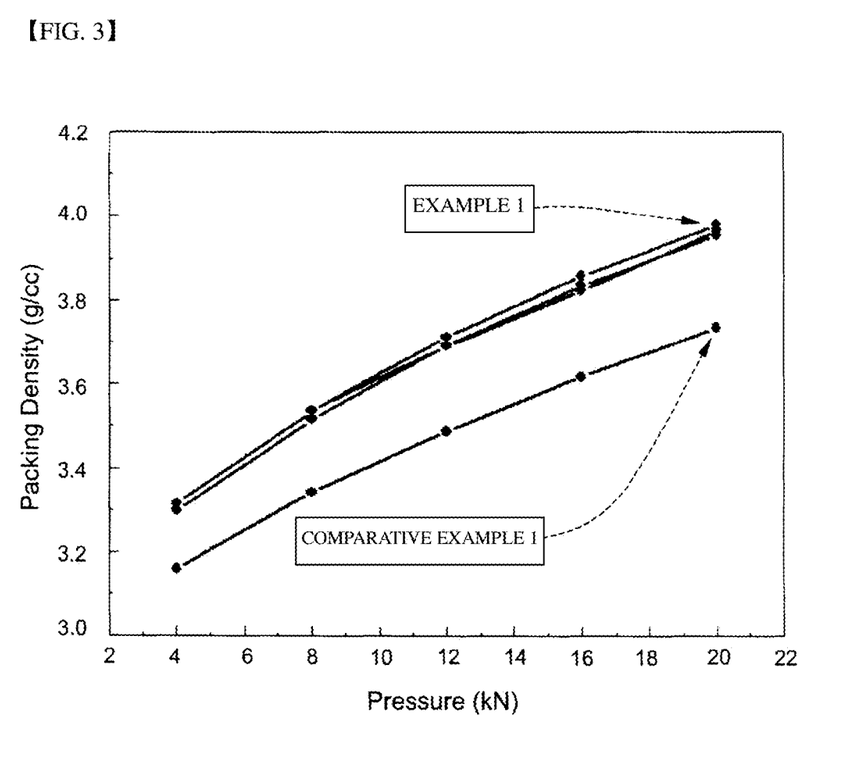
FIG. 3 is a comparison graph of density changes according to pressure of a cathode active material according to Experimental Example 1 and Comparative Example 1.

As confirmed in FIG. 3, a rolling density of the cathode active material having a bimodal form was approximately 0.4 g/cc higher, when compared to the cathode active material, which is not a bimodal form, composed of $LiCoO_2$ and the lithium nickel-based oxide having a similar average diameter thereto.

Example 2

Manufacture of Cathode

A cathode active material having a bimodal form was prepared in the same manner as in Example 1, except that Mg (1000 ppm) and Ti (1000 ppm) were doped, and $LiCoO_2$, a whole surface of which was coated with Al (400 ppm), was used. In addition, the cathode active material having a bimodal form, Super P as a conductive material, and polyvinylidene fluoride as a binder were mixed in a weight ratio of 96:2:2 and then N-methyl pyrrolidone (NMP) was added thereto, to prepare a slurry. The resulting cathode slurry was coated on an aluminum collector and then dried in a 120 vacuum oven, to prepare a cathode.

Manufacture of Anode

After mixing Si and $SiO_2$ in a molar ratio of 1:1, the resulting mixture was vacuum heat-treated at 800° C., to prepare $SiO_{1-x}$ (where x is 0). $SiO_{1-x}$ (available from Shinetsu), MAG-V2 (available from Hitachi), and AGM01 (available from Mitsubish) were mixed in a ratio of 5:10.6:84.4, to prepare a mixed anode active material.

The mixed anode active material, Super P (or DB) as a conductive material, SBR as a binder and CMC as a thickening agent were mixed in a ratio (weight ratio) of 96.55:0.7:1.75:1, and then were dispersed. Subsequently, the resulting mixture was coated on copper foil to prepare an anode.

Manufacture of Lithium Secondary Battery

An electrode assembly was manufactured by interposing a separator between the prepared cathode and anode. After accommodating the electrode assembly in an aluminum can or an aluminum pouch, electrode leads were connected thereto. Subsequently, a carbonate based composite solution including 1 M LiPF6 as an electrolyte was injected thereinto. The resulting battery case was sealed, thereby completing fabrication of a lithium secondary battery.

Comparative Example 2

A cathode, anode, electrolyte and lithium secondary battery were manufactured in the same manner as in Example 2, except that, in Example 1, Mg (1000 ppm) and Ti (1000 ppm) were doped, and $LiCoO_2$, a whole surface of which was coated with Al (400 ppm) and $LiNi_{0.55}Mn_{0.30}Co_{0.15}O_2$, a surface of which was not coated, were used.

Comparative Example 3

A cathode, anode, electrolyte and lithium secondary battery were manufactured in the same manner as in Example 2, except that, in Example 1, Mg (1000 ppm) and Ti (1000 ppm) are doped, and $LiCoO_2$, a whole surface of which was coated with Al (400 ppm) and $LiNi_{0.55}Mn_{0.30}Co_{0.15}O_2$, a surface of which was coated with F (100 ppm), were used.

Comparative Example 4

A cathode, anode, electrolyte and lithium secondary battery were manufactured in the same manner as in Example 2, except that, in Example 1, Mg (1000 ppm) and Ti (1000 ppm) are doped, and $LiCoO_2$, a whole surface of which was coated with Al (400 ppm) and $LiNi_{0.55}Mn_{0.30}Co_{0.15}O_2$, a surface of which was coated with F (3500 ppm), were used.

Experimental Example 2

To confirm effect according to surface coating of the lithium nickel-manganese-cobalt oxide, a thickness change degree, which is caused by battery swelling according to temperature change, of the battery manufactured according to each of Example 2 and Comparative Examples 2 to 4 was compared. Results are shown in FIG. 4 below and a discharge capacity of the battery manufactured according to each of Example 2 and Comparative Examples 2 to 4 is summarized Table 1 below.

TABLE 1

| | Discharge capacity at 4.4 V |
|---|---|
| Example 2 | 175 mAh/g |
| Comparative Example 2 | 175 mAh/g |
| Comparative Example 3 | 175 mAh/g |
| Comparative Example 4 | 173 mAh/g |

Figure 4:
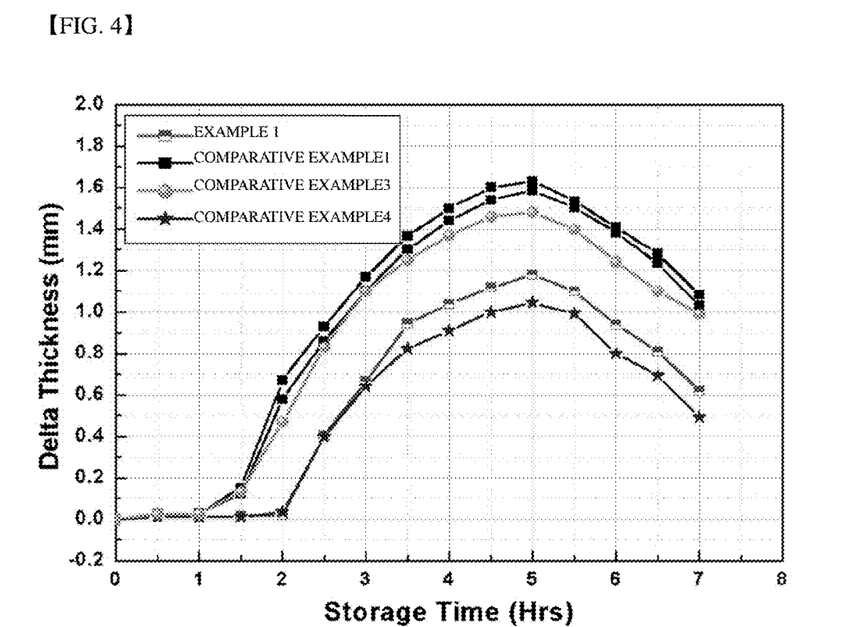
FIG. 4 is a comparison graph of temperature changes and high-temperature storage characteristics of lithium secondary batteries according to Experimental Example 2, and Comparative Examples 2 to 4.

As confirmed in FIG. 4, the battery using the cathode active material, which had a bimodal form, including the lithium nickel-manganese-cobalt oxide coated with the material containing 2000 ppm of fluorine based on the total weight of the lithium nickel-based oxide as a cathode material exhibited excellent high-temperature storage characteristics, when compared to the battery using the non-coated lithium nickel-manganese-cobalt oxide or the cathode active material, which had a bimodal form, including the lithium nickel-manganese-cobalt oxide coated with the material containing fluorine of 100 ppm based on the total weight of the lithium nickel-based oxide.

In addition, as confirmed in Table 1, when the cathode active material, which had a bimodal form, including the lithium nickel-manganese-cobalt oxide coated with the material containing fluorine of 3500 ppm based on the total weight of the lithium nickel-based oxide was used as a cathode material, discharge capacity was reduced approximately 1%, when compared to the battery manufactured according to Example 2.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cathode active material for secondary batteries having an operating voltage area of 2.50 V to 4.35 V, comprising a lithium cobalt-based oxide and a surface-treated lithium nickel-based oxide, wherein the cathode active material has high rolling density by a bimodal form in which an average diameter of the cobalt-based oxide and an average diameter of the lithium nickel-based composite oxide are different;
   wherein the lithium nickel-based oxide forms a coating layer over a whole surface of the lithium nickel-based oxide by reacting with a fluorine-containing polymer, and the coating layer comprises 1000 to 2000 ppm of fluorine based on the total weight of the lithium nickel-based oxide; and
   wherein a whole surface of the lithium cobalt-based oxide is coated with Al2O3 and the amount of Al is 0.001 to 2000 ppm based on a total amount of the lithium cobalt-based oxide.

2. The cathode active material according to claim 1, wherein the rolling density of the cathode active material is 3.8 to 4.0 g/cc.

3. The cathode active material according to claim 1, wherein an average diameter of the lithium cobalt-based oxide is 16 to 25 μm and an average diameter of the lithium nickel-based oxide is 2 to 10 μm.

4. The cathode active material according to claim 1, wherein an average diameter of the lithium cobalt-based oxide is 2 to 10 μm and an average diameter of the lithium nickel-based oxide is 16 to 25 μm.

5. The cathode active material according to claim 1, wherein the lithium cobalt-based oxide is represented by Formula 1 below:

$$Li(Co_{(1-a)}M_a)O_2 \quad (1)$$

wherein $0.1 \leq a \leq 0.2$, and
M is at least one element selected the group consisting of Mg, Ti, Zr, Al and Si.

6. The cathode active material according to claim 5, wherein M is Mg and/or Ti.

7. The cathode active material according to claim 1, wherein the amount of Al is 350 to 500 ppm.

8. The cathode active material according to claim 1, wherein a coating thickness of Al2O3 is 0.5 to 2 nm.

9. The cathode active material according to claim 1, wherein Al2O3 is coated on a surface of the lithium cobalt-based oxide through wet coating.

10. The cathode active material according to claim 1, wherein the lithium nickel-based oxide is represented by Formula 2 below and comprised in an amount of 10 to 50 wt % based on a total amount of the cathode active material:

$$Li_{1+x}Ni_aMn_bCo_{1-(a+b)}O_2 \quad (2)$$

wherein $-0.2 \leq x \leq 0.2$, $0.5 \leq a \leq 0.6$, and $0.2 \leq b \leq 0.3$.

11. The cathode active material according to claim 10, wherein the lithium nickel-based oxide is comprised in 20 to 40 wt % based on a total amount of the cathode active material.

12. The cathode active material according to claim 1, wherein the fluorine-containing polymer is PVdF or PVdF-HFP.

13. The cathode active material according to claim 12, wherein the fluorine-containing polymer is PVdF.

14. The cathode active material according to claim 1, wherein a whole surface of the lithium nickel-based oxide is coated with a metal oxide, and an amount of the metal is 0.001 to 3000 ppm based on the total weight of the lithium nickel-based oxide.

15. The cathode active material according to claim 14, wherein the metal oxide is Al2O3.

16. The cathode active material according to claim 1, wherein the coating is performed to a thickness of 0.5 to 2 nm.

17. The cathode active material according to claim 1, wherein the coating is performed through wet coating or dry coating.

18. A lithium secondary battery comprising the cathode active material according to claim 1, wherein an operating voltage area is 2.50 V to 4.35 V.

19. The cathode active material according to claim 14, wherein an amount of the metal is 1000 to 2000 ppm based on the total weight of the lithium nickel-based oxide.

20. The cathode active material according to claim 14, wherein the coating is performed to a thickness of 0.5 to 2 nm.

21. The cathode active material according to claim 14, wherein the coating is performed through wet coating or dry coating.

* * * * *